March 2, 1954   M. BITZER   2,670,720
FLUID MOTOR VALVE MEANS
Filed Jan. 8, 1949   2 Sheets-Sheet 1
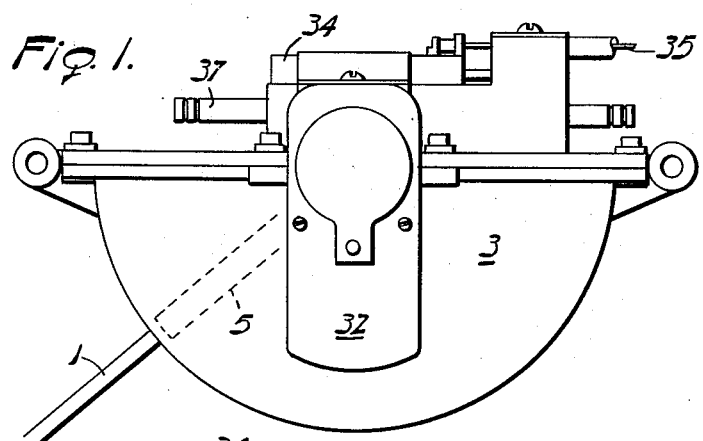
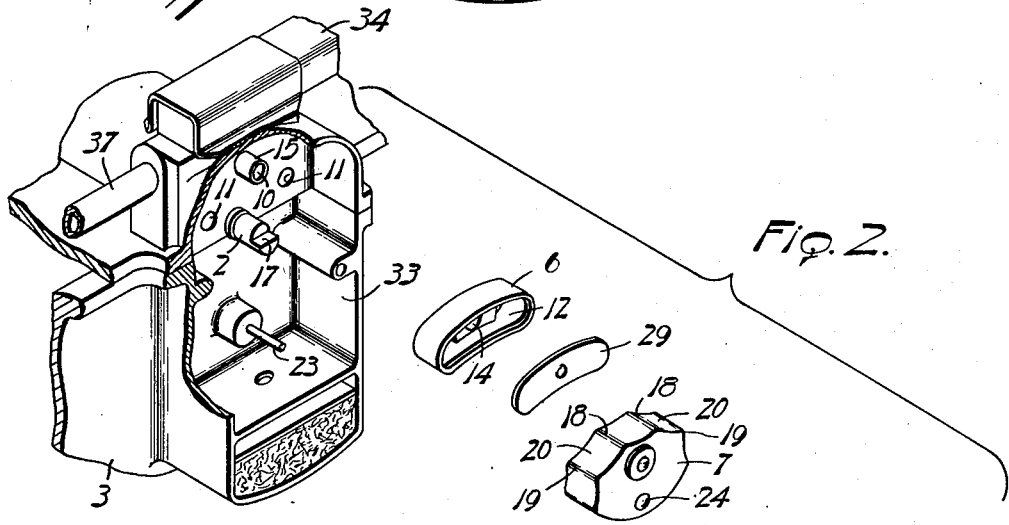
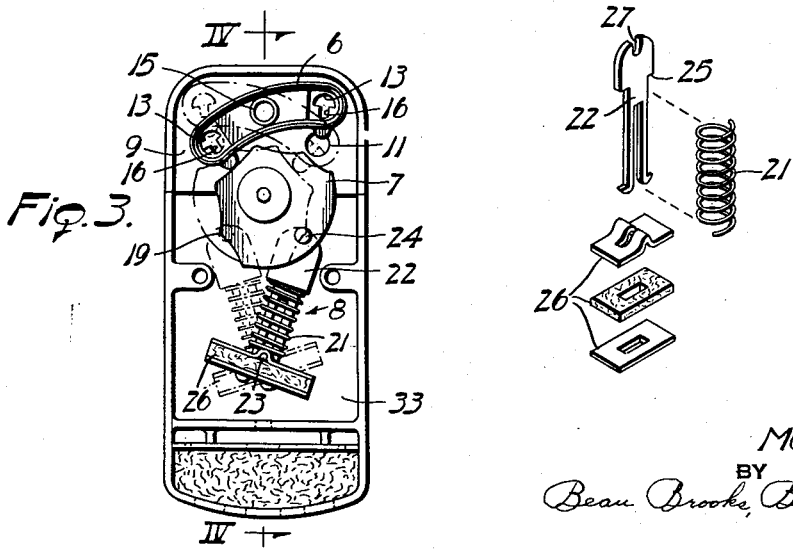
INVENTOR
*Martin Bitzer*
BY
Bean, Brooks, Buckley & Bean
ATTORNEYS March 2, 1954  M. BITZER  2,670,720
FLUID MOTOR VALVE MEANS
Filed Jan. 8, 1949  2 Sheets-Sheet 2

INVENTOR
Martin Bitzer
BY
Beau, Brooks, Buckley & Beau.
ATTORNEYS

Patented Mar. 2, 1954

2,670,720

UNITED STATES PATENT OFFICE 2,670,720

FLUID MOTOR VALVE MEANS

Martin Bitzer, Kenmore, N. Y., assignor to Trico Products Corporation, Buffalo, N. Y.

Application January 8, 1949, Serial No. 69,896

10 Claims. (Cl. 121—164)

This invention relates to the windshield cleaning art and especially to the fluid-powered field wherein fluid pressure serves as a medium for oscillating the wiper back and forth upon the glass.

Due to the inertia within the moving wiping blade the latter is caused to override the ends of its stroke and frequently strike the windshield molding to the annoyance of the motorist and the damage of the structure.

The primary object of this invention is to provide a cleaner which will automatically regulate its wiper movement against the objectionable overtravel for increased efficiency.

Again, the invention resides in a fluid actuated cleaner wherein the reciprocatory wiper is afforded a cushioned retard preliminary to reversing its stroke for quiet and satisfactory performance.

Furthermore, the invention aims to provide a practical and efficient fluid motor and a valve action therefor by which the motor operation is rendered quiet and the reversal of motion is accomplished in a manner to prolong the life of the mechanism.

The foregoing and other objects will manifest themselves as this description progresses, reference being made to the accompanying drawings, wherein Fig. 1 is an elevation of the improved windshield cleaner;

Fig. 2 is an exploded view in perspective of the valve action;

Fig. 3 is a front elevation of the valve action;

Figure 4:
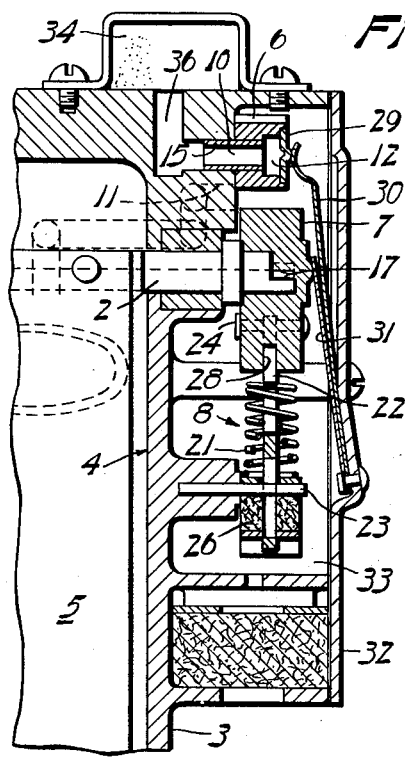
Fig. 4 is an enlarged sectional view through the valve action as seen about on line 4—4 of Fig. 3.
Figure 5:
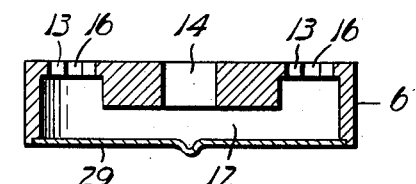
Fig. 5 is a sectional view through the rockable valve about on line 5—5 of Fig. 6.
Figure 6:
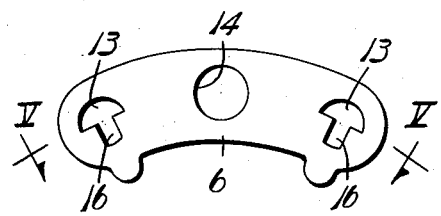
Fig. 6 is an elevation of the rockable valve.

Referring more particularly to the drawings, the numeral 1 designates the wiper or blade suitably connected to the shaft 2 of a fluid motor 3 for being oscillated thereby. The motor illustrated has an arcuate chamber 4 containing a vane-like piston 5 fixed to a concentrically disposed motor shaft 2. Fluid pressure is operatively applied to the piston by a valve action comprising a valve 6, a kicker or actuator 7 therefor, and an energizing device 8. The valve is movable upon a seat 9 to connect a pressure supply port 10 alternately to the two chamber ports 11 for which purpose the valve will have a port connecting passage 12. Preferably, the valve is hollow and the seat engaging wall thereof has two ports 13, designed to register with the chamber ports, and an intermediate port 14 which is in constant communication with the supply port. The wall portion about the port 14 is made heavier, as shown in Fig. 5, to form a bearing for the fixed tubular stub shaft 15 by which the valve is rockably mounted.

This valving arrangement incorporates means for controllably restricting the port capacity and thereby retarding the wiper motion. In the illustrated embodiment such means are in the form of reduced extensions 16 to the ports 13 which, when moved to a position overlying the chamber ports 11, will reduce the effective size of the valve orifice.

Figure 7:
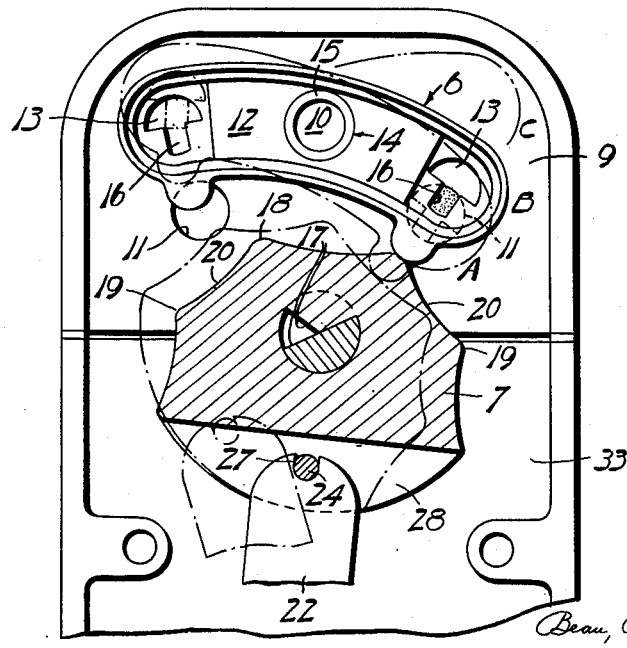
Fig. 7 is a view diagrammatically depicting more clearly the valve action.

The valve kicker or actuator 7 is initially rocked by the motor shaft through a play connection therewith and thereafter the energizing device 8 will function to reverse the wiper movement. As illustrated, the kicker is journaled on the adjacent end of the motor shaft and shaped to provide cooperating pairs of shoulders 17. The kicker is in the nature of a cam and has two cam surfaces each with a pair of circumferentially spaced lobes 18 and 19, with an intermediate dwell portion 20. The lobes of each pair or set are designed to engage successively a respective lug 6' on the valve to move it different increments of movement, first to an intermediate port-restricting position and then to a port-closing position. In other words, the cam lobes 19 have larger radial extent than the lobes 18 so as to throw the valve a greater extent to carry the valve from its restricted position to its fully closed position. After a preliminary travel of the piston, the shoulders 17 will contact each other and move the kicker 7 therealong with the shaft. During this movement in unison, the valve setting lobe 18 will initially act to shift the active valve port from its full-communication or operative position A, Fig. 7, to the port restricting position B wherein the effective port capacity is reduced substantially to that of the extension 16, as indicated by the stippling. The valve will remain momentarily in this portion while the dwell portion 20 is passing and thereafter the succeeding lobe 19 will shift the valve to its other operative position C. This final shifting movement will be accelerated by the energizing device 8 to kick the valve to its new position. The energizing device comprises a coil spring 21 and a supporting link 22 therefor. The link is guided by an anchor pin 23 and is pivotally connected by a pin 24 to the kicker to cooperate therewith toggle-fashion.

As the kicker is rocked by the motor shaft the spring toggle will move across a dead center position and quickly snap the actuator to bring its second lobe 19 against the valve with an impact sufficient to kick the valve to its other operative position. The spring is compressed between shoulders 25 on its supporting link 22 and a silencing pad 26 on the anchor pin. The spring therefore will exert a force lengthwise of the link so that the upper end of the latter may be notched, as at 27, to receive the pivot pin 24 where it will be held by the spring urge. The silencing pad 26, which includes upper and lower plates with an intermediate layer of felt, as shown clearly in Fig. 2, is threaded over the link 22 and slipped sidewise over the anchor pin 23 after initially placing the spring. Thereafter, the link is backed away from the valve kicker against the spring urge until the notched end 27 is entered in the slot 28 of the kicker and engaged with the pin 24. These features facilitate assemblage of the action parts as well as provide for economy in production.

The hollow valve 6 may be die cast in the form of a cup-shaped body, Fig. 2, and closed by a cover plate 29. A flat spring 30 bearing upon the valve may serve to assist the pressure differential in holding the latter in place on its hollow supporting shaft 15. Likewise, a flat spring 31 may bear upon the kicker to secure it in position. Both of these flat springs may be carried on the under side of the cover plate 32 for the valve chamber 33. A control valve 34, operable from a remote point by the flexible cable 35, may be moved to connect the pressure supply passage 36 to the pressure supply line 37.

The effect of the passage restriction is to provide an air cushion in advance of the fast moving piston which slows down the wiper motion to a practical extent before reversing the direction of travel. The valve actuator is dual functioning in character in that it first sets the valve to restrict the capacity and thereafter reverses the application of pressure to the piston. The motor is especially adapted for operation off of the intake manifold of the vehicle engine though not confined thereto. The disclosed embodiment has proved practical in controlling the terminal wiper movements against excessive overtravel.

The foregoing description has been given in detail and not by way of limitation since the inventive principles involved are capable of assuming other physical embodiments without departing from the spirit of the invention and the scope of the appended claims.

What is claimed is:

1. A fluid motor having a valve seat with a pressure supply port between two chamber ports, a valve movable on the seat to connect the supply port alternately to the chamber ports, a pressure responsive member movable back and forth in accordance with the valve movement, and a rockable cam operable by the member and having two sets of circumferentially spaced valve actuating cam face portions provided with an intermediate dwell portion, said cam face portions of each set serving successively to move the valve to a port restricting position, preliminary to shifting the valve to its other port connecting positions, and then follow with such shifting operation.

2. A valve action for fluid motors, comprising a valve seat having a pressure supply port and two chamber ports, a valve movable back and forth between two operative positions for connecting the supply port alternately to the chamber ports, and a rockable valve shifting cam having two sets of circumferentially spaced portions each set acting successively to move the valve to restrict the then connected ports and then to fully close off their communication in shifting the valve to connect the supply port to the companion chamber port.

3. A valve action for fluid motors, comprising a valve seat having a pressure supply port and two chamber ports, a valve rockable back and forth between two operative positions for connecting the supply port alternately to the chamber ports, and a power-rocked cam having two sets of circumferentially spaced cam surfaces each set acting to rock the valve one in one direction with successive increments of movements and the other in the opposite direction with like increments of movements, each cam surface having an intermediate dwell portion acting to momentarily hold the valve to restrict the communication before fully closing off the same as the valve is rocked into its next position.

4. A fluid motor valve action comprising a valve seat and a valve movable back and forth thereon each provided with spaced sets of alternately registrable ports, one port of each set being formed with a restricting extension, said valve being movable relative to the seat in the direction of the extension from an open position of port registry through an intermediate restricted position wherein the extension only is in registry to a closed position wherein the ports are offset to close off the communication, and means for so moving the valve relative to its seat, said means including a rockable cam having two peripheral lobes circumferentially spaced and successively engaging the valve to move it first to the intermediate position and then to the closed position.

5. A fluid motor valve action comprising a valve seat formed with spaced ports, a valve rockable on the seat and having spaced ports cooperating and alternately registering with a respective one of the first ports, one of each set of cooperating ports having a restricting extension alternately registrable alone with its respective port in an intermediate position of the valve between its fully opened and fully closed limit positions, and a cam having an edge portion with spaced lobes thereon of relatively different throw and successively operable to rock the valve from a fully open position to the intermediate position, followed by an additional movement to a fully closed position, said cam including a dwell part intermediate the lobes for momentarily arresting the valve in its port-restricted position.

6. A fluid motor having a valve chamber with a seat provided with spaced chamber ports and an intermediate supply port, a hollow rockable valve journaled in the seat and displaceable axially therefrom, said hollow valve having three ports consisting of two lateral ports and an intermediate port opening thereinto with the intermediate port opening through the journal bearing into the supply port and the lateral ports being alternately registrable with the chamber ports, an oscillatory drive shaft extending into the chamber, a closure for the chamber, means operable by the shaft for rocking the valve, and resilient means reacting between the closure and the valve for yieldably holding the latter from displacement.

7. A fluid motor having a valve chamber with a seat provided with spaced chamber ports and an intermediate supply port, a hollow rockable valve journaled in the seat and displaceable axially therefrom, said hollow valve having three ports consisting of two lateral ports and an intermediate port opening thereinto with the intermediate port opening through the journal bearing into the supply port and the lateral ports being alternately registrable with the chamber ports, an oscillatory drive shaft extending into the chamber, a closure for the chamber, a valve actuating cam on the shaft removable therefrom by axial movement, and resilient means on the cover acting yieldably to hold the valve and the cam from displacement.

8. A fluid motor valve action comprising a valve seat formed with spaced ports, a valve rockable on the seat and having spaced ports cooperating and alternately registering with a respective one of the first ports, one of each set of cooperating ports having a restricting extension alternately registrable alone with its respective port in an intermediate position of the valve between its fully opened and fully closed limit positions, and a rockable cam off-center from the valve and having circumferentially spaced peripheral pairs of lobes, each pair having lobes of different radial extent acting to rock the valve in a respective direction from one limit position to its other limit position, one lobe of each pair acting initially to rock the valve to its intermediate position for a period of dwell followed by the other lobe acting to carry the valve through to its limit position.

9. A fluid motor having a valve chamber with a seat provided with spaced chamber ports and an intermediate supply port, and a hollow rockable valve journaled in the seat and displaceable axially therefrom, said hollow valve having three ports consisting of two lateral ports and an intermediate port opening thereinto with the intermediate port opening through the journal bearing into the supply port and the lateral ports being alternately registrable with the chamber ports, said supply port having a tubular stub shaft projecting therefrom for such journal support in the intermediate port of the hollow valve, such tubular stub shaft opening into the hollow valve for establishing communication with the lateral ports thereof.

10. A fluid motor having a valve chamber with a seat provided with spaced chamber ports and an intermediate supply port, a hollow rockable valve journaled in the seat and displaceable axially therefrom, said hollow valve having three ports consisting of two lateral ports and an intermediate port opening thereinto with the intermediate port opening through the journal bearing into the supply port and the lateral ports being alternately registrable with the chamber ports, said supply port having a tubular stub shaft projecting therefrom for such journal support in the intermediate port of the hollow valve, such tubular stub shaft opening into the hollow valve for establishing communication with the lateral ports thereof, removable means blocking axial displacement of the valve from the tubular stub shaft, and a spring actuated kicker pivoted off-center from the tubular stub shaft and having a peripheral cam lobe portion acting directly upon the valve to so rock it.

MARTIN BITZER.

References Cited in the file of this patent

UNITED STATES PATENTS

| Number | Name | Date |
|---|---|---|
| 1,726,226 | Hueber | Aug. 27, 1929 |
| 1,777,142 | Hueber | Sept. 30, 1930 |
| 1,853,758 | Brumm | Apr. 12, 1932 |
| 1,857,719 | Gerling | May 10, 1932 |
| 1,885,070 | Balsiger | Oct. 25, 1932 |
| 1,973,482 | Hueber | Sept. 11, 1934 |
| 2,075,959 | Previti | Apr. 6, 1937 |
| 2,164,876 | Horlacher | July 4, 1939 |
| 2,172,981 | Maglott | Sept. 12, 1939 |
| 2,240,381 | Sibley | Apr. 29, 1941 |
| 2,298,734 | Buchmann | Oct. 13, 1942 |
| 2,354,189 | Bell | July 25, 1944 |
| 2,363,621 | Rappl | Nov. 28, 1944 |
| 2,563,068 | Rappl et al. | Aug. 7, 1951 |